(12) United States Patent
Jain et al.

(10) Patent No.: US 11,797,840 B2
(45) Date of Patent: Oct. 24, 2023

(54) MACHINE LEARNING BASED APPROACH FOR IDENTIFICATION OF EXTREMELY RARE EVENTS IN HIGH-DIMENSIONAL SPACE

(71) Applicant: INTERNATIONAL BUSINESS MACHINES CORPORATION, Armonk, NY (US)

(72) Inventors: Sanket Jain, Gurgaon (IN); Kumar Apurva, Patna (IN); Vikram Yadav, Bangkok (TH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 925 days.

(21) Appl. No.: 16/202,973

(22) Filed: Nov. 28, 2018

(65) Prior Publication Data

US 2020/0167634 A1    May 28, 2020

(51) Int. Cl.
    *G06N 3/08*      (2023.01)
    *G06N 20/00*     (2019.01)
    *G06N 7/00*      (2023.01)
    *G06F 18/214*     (2023.01)
    *G06N 3/047*     (2023.01)

(52) U.S. Cl.
    CPC ............ *G06N 3/08* (2013.01); *G06F 18/214* (2023.01); *G06N 3/047* (2023.01); *G06N 7/00* (2013.01); *G06N 20/00* (2019.01)

(58) Field of Classification Search
None
See application file for complete search history.

(56) References Cited

U.S. PATENT DOCUMENTS

2019/0257771 A1*   8/2019   Desmulliez ............... H01P 3/16

FOREIGN PATENT DOCUMENTS

WO     2017003499      1/2017

OTHER PUBLICATIONS

Mozer, Michael C., et al. "Predicting subscriber dissatisfaction and improving retention in the wireless telecommunications industry." IEEE Transactions on neural networks 11.3 (2000): 690-696. (Year: 2000).*

Song, Guojie, et al. "A mixed process neural network and its application to churn prediction in mobile communications." Sixth IEEE International Conference on Data Mining-Workshops (ICDMW'06). IEEE, 2006. (Year: 2006).*

(Continued)

*Primary Examiner* — Vincent Gonzales
(74) *Attorney, Agent, or Firm* — Monchai Chuaychoo; Andrew D. Wright; Calderon Safran & Cole, P.C.

(57) ABSTRACT

Methods and systems for using machine learning to identify extremely rare events in high-dimensional space are disclosed. A method includes: identifying, by a computing device, a plurality of derived attributes using an external data source; selecting, by the computing device, a plurality of key performance indicators from the plurality of derived attributes using a neural network and based on an extremely rare event being modeled; constructing, by the computing device, a linear model using the plurality of key performance indicators; and predicting, by the computing device, occurrences of the extremely rare event using the linear model.

16 Claims, 3 Drawing Sheets

(56) References Cited

OTHER PUBLICATIONS

Kuhn, Max. "Classification Using C5. 0 UseR! 2013." Pfizer Global R&D: Groton, CT, USA (2013). Available at https://staff.fmi.uvt.ro/~daniela.zaharie/dm2019/EN/lab/lab3/biblio/user_C5.0.pdf, accessed Jun. 18, 2021. 20 pages. (Year: 2013).*

Duhman, E., Y. Ekinci, and A. Tanriverdi, "Comparing alternative classifiers for database marketing: the case of imbalanced datasets", Expert Systems with Applications 39.1, Jan. 2012, pp. 48-53. (Year: 2012).*

Milne L., Feature selection using neural networks with contribution measures. In AI-Conference—Nov. 27, 1995 (pp. 571-571). World Scientific Publishing. (Year: 1995).*

Chandrashekar G, Sahin F. A survey on feature selection methods. Computers & Electrical Engineering. Jan. 1, 2014;40(1):16-28. (Year: 2014).*

Basheer IA, Hajmeer M. Artificial neural networks: fundamentals, computing, design, and application. Journal of microbiological methods. Dec. 1, 2000;43(1):3-1. (Year: 2000).*

Yu R, Qiu H, Wen Z, Lin C, Liu Y. A survey on social media anomaly detection. ACM SIGKDD Explorations Newsletter. Aug. 1, 2016; 18(1):1-4. (Year: 2016).*

James G, Witten D, Hastie T, Tibshirani R. An introduction to statistical learning. New York: Springer. Jun. 2013. Corrected 8th printing 2017. 441 pages. (Year: 2017).*

Chandola V, Banerjee A, Kumar V. Anomaly detection: a survey. ACM computing surveys (CSUR). Jul. 30, 2009;41(3):1-58. (Year: 2009).*

Vannucci et al., "Detection of Rare Events Within Industrial Datasets by Means of Data Resampling and Specific Algorithms", IJSSST, vol. 11, No. 3, 2010, 11 pages.

Anonymous, "How to handle Imbalanced Classification Problems in machine learning?", Analytics Vidhya, https://www.analyticsvidhya.com/blog/2017/03/imbalanced-classification-problem/, Mar. 17, 2017, 27 pages.

Auslender, "The issue of classification versus precision rates in comparing classification models Informs NYC Sep. 2015", http://nymetro.chapter.informs.org/prac_cor_pubs/09-2015%20LeonardoAuslenderClassifPrecisionLift.pptx.pdf, Oct. 5, 2015, 55 pages.

Anonymous, "Estimating classification probability, with low event rates—options other than logistic regression?", http://stats.stackexchange.com/questions/178343/estimatingclassification-probability-with-low-event-rates-options-other-tha, Cross Validated, accessed Nov. 19, 2018, 3 pages.

Anonymous, "Applying logistic regression with low event rate" http://stats.stackexchange.com/questions/10236/applyinglogistic-regression-with-low-event-rate. Cross Validated, accessed Nov. 19, 2018, 3 pages.

Consalvi et al., "Measuring prepayment risk: an application to UniCredit Family Financing", http://unicreditanduniversities.eu/uploads/assets/WP_2010/WorkingPaper_n5_ConsalviScotto.pdf, May 2010, 39 pages.

Anonymous, "In classification, how do you handle an unbalanced training set?", Quora, https://www.quora.com/In-classification-how-do-you-handle-an-unbalanced-training-set, accessed Nov. 19, 2018, 12 pages.

Anonymous, "Why do we have to normalize the input for an artificial neural network?", https://stackoverflow.com/questions/4674623/why-do-we-have-to-normalize-the-input-for-an-artificial-neural-network. Stack Overflow, accessed Nov. 19, 2018, 8 pages.

Raschka, "About Feature Scaling and Normalization—and the effect of standardization for machine learning algorithms", http://sebastianraschka.com/Articles/2014_about_feature_scaling.html, Jul. 11, 2014, 25 pages.

Anonymous, "Data normalization and standardization in neural networks", http://stats.stackexchange.com/questions/7757/data-normalization-and-standardization-inneural-networks. Cross Validated, accessed Nov. 19, 2018, 3 pages.

Anonymous, "1.3.5.16. Kolmogorov-Smirnov Goodness-of-Fit Test", Engineering Statistics Handbook, http://www.itl.nist.gov/div898/handbook/eda/section3/eda35g.htm, accessed Nov. 19, 2018, 4 pages.

Anonymous, "What are methods to make a predictive model more robust to outliers?", Quora, https://www.quora.com/What-are-methods-to-make-a-predictive-model-more-robust-to-outliers, accessed Nov. 19, 2018, 5 pages.

Brownlee, "Crash Course on Multi-Layer Perceptron Neural Networks", http://machinelearningmastery.com/neural-networks-crash-course/, May 17, 2016, 8 pages.

Anonymous, "Unsupervised deep artificial neural network classifier for rare occurrences of an event", http://stackoverflow.com/questions/27736244/unsupervised-deep-artificial-neuralnetwork-classifier-for-rare-occurrences-of-a, Stack Overflow, accessed Nov. 19, 2018, 3 pages.

Lazarević, "Data Mining for Analysis of Rare Events: a Case Study in Security, Financial and Medical Applications", http://www-users.cs.umn.edu/~aleks/pakdd04_tutorial.pdf, 2004, 54 pages.

Choe et al., "Detection of Rare Events and Rule Extracition by Neural Networks and Decision Trees", http://docs lib.purdue edu/cgi/viewcontent.cgi?article=1017&context=ecetr, 2000, 169 pages.

Anonymous, "How do I improve machine learning prediction rates for rare events?", Quora, https://www.quora.com/How-do-I-improve-machine-learning-prediction-rates-for-rareevents, accessed Nov. 19, 2018, 4 pages.

Carpenter et al., "A Self-Organizing Neural Network for Supervised Learning, Recognition, and Prediction", IEEEE Communication Magazines, Sep. 1992, 12 pages.

Kasiran et al., "Customer Churn Prediction using Recurrent Neural Network with Reinforcement Learning Algorithm in Mobile Phone Users", International Journal of Intelligent Information Processing (IJIIP), Mar. 2014, 11 pages.

Kasenberg et al., "Norms, Rewards, and the Intentional Stance: Comparing Machine Learning Approaches to Ethical Training", Association for the Advancement of Artificial Intelligence, 2018, 7 pages.

Svetlik et al., "Automatic Curriculum Graph Generation for Reinforcement Learning Agents", Association for the Advancement of Artificial Intelligence, 2017, 7 pages.

Anonymous, "Exploring the 'hidden' neural network model nodes in Modeler", Data Mining Insights, http://datamininginsights.co.uk/2015/01/06/exploring-the-hidden-neural-network-model-nodes-in-modeler/, Jan. 6, 2015, 10 pages.

Beliakov et al., "Robust artificial neural networks and outlier detection", Technical report, Oct. 2, 2011, 39 pages.

Du Toit et al., "Customer Loyalty in Retail Banking: Global Edition 2013", Bain & Company, https://www.bain.com/insights/customer-loyalty-in-retail-banking-2013, Nov. 6, 2013, 41 pages.

Reinartz et al., "The Mismanagement of Customer Loyalty", Harvard Business Review, https://hbr.org/2002/07/the-mismanagement-of-customer-loyalty, Jul. 2002, 17 pages.

* cited by examiner

MACHINE LEARNING BASED APPROACH FOR IDENTIFICATION OF EXTREMELY RARE EVENTS IN HIGH-DIMENSIONAL SPACE

BACKGROUND

The present invention generally relates to computing devices and, more particularly, to methods and systems for using machine learning to identify extremely rare events in high-dimensional space.

Modeling techniques are used to predict various extremely rare events, including subscriber churn (turnover). Support vector machines (SVMs), logistic regression, and decision trees may be used for extremely rare event modeling, including churn management and churn prediction. As used herein, the term "extremely rare event" refers to a binary dependent variable (e.g., churn) that is characterized by substantially fewer events than non-events, and in particular, a number of events that is less than 1% of the number of non-events (e.g., fewer than 100 events for every 10,000 non-events).

SUMMARY

In a first aspect of the invention, there is a method that includes: identifying, by a computing device, a plurality of derived attributes using an external data source; selecting, by the computing device, a plurality of key performance indicators from the plurality of derived attributes using a neural network and based on an extremely rare event being modeled; constructing, by the computing device, a linear model using the plurality of key performance indicators; and predicting, by the computing device, occurrences of the extremely rare event using the linear model.

In another aspect of the invention, there is a computer program product that includes a computer readable storage medium having program instructions embodied therewith. The program instructions are executable by a computing device to cause the computing device to: identify a plurality of derived attributes; select a plurality of key performance indicators from the plurality of derived attributes using a neural network and based on an extremely rare event being modeled; construct a linear model using the plurality of key performance indicators; predict occurrences of the extremely rare event using the linear model; and target a marketing campaign using the predicted occurrences of the extremely rare event.

In another aspect of the invention, there is a system that includes: a hardware processor, a computer readable memory, and a computer readable storage medium associated with a computing device; program instructions to identify a plurality of derived attributes; program instructions to select a plurality of key performance indicators from the plurality of derived attributes using a neural network and based on an extremely rare event being modeled; program instructions to construct a linear model using the plurality of key performance indicators; and program instructions to predict occurrences of the extremely rare event using the linear model, wherein the program instructions are stored on the computer readable storage medium for execution by the hardware processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
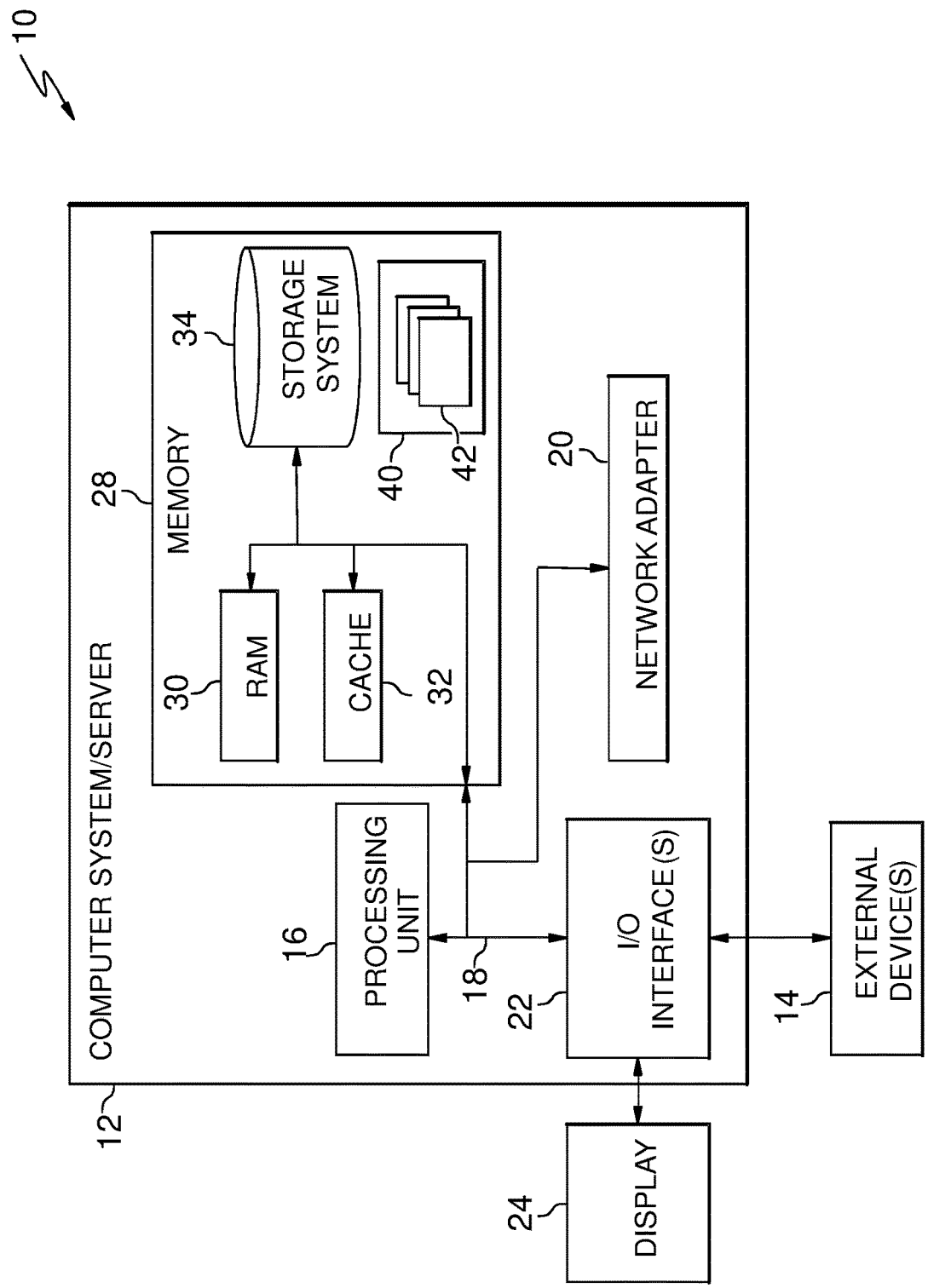
FIG. 1 depicts a computer system in accordance with aspects of the invention.

The present invention generally relates to computing devices and, more particularly, to methods and systems for using machine learning to identify extremely rare events in high-dimensional space. As described herein, aspects of the invention include a method and system that identify and track derived attributes, analyze the derived attributes on a neural network, use machine learning and statistical techniques to select, from the derived attributes, key performance indicators that are the most significant with respect to an extremely rare event, construct a linear model using the selected key performance indicators, and measure the performance of the constructed linear model on different datasets.

In telecommunications, extremely rare event modeling is used for churn management (e.g., to predict and attempt to reduce subscriber churn). However, the available data regarding the loyal subscriber base is typically limited. Since the number of subscribers with at least ninety days age on a network that are captured in the dataset as loyal may be very few, and the advertising campaigns that are targeted for them with rate plan codes may have a very small chance of uptake, it may be an extremely rare event (e.g., 0.02%) where a loyal customer accepts a rate plan code in a given short timeframe for which that advertising campaign is valid. An extremely rare event is also called the class imbalance problem because the number of instances or cases of a loyal subscriber taking the offer are fewer than those who choose not to take it.

In embodiments, a supervised learning-based approach is applied on a framework of heterogeneous and large datasets spanning loyalty tables, social media posts, etc. Embodiments use neural networks and perform deep learning because neural networks are more robust than support vector machines (SVMs). These neural networks and deep learning techniques improve prediction reliability, particularly when the event rate drops to 0.02%.

Loyal customers are typically more familiar with a company's transaction processes. Since they may need less assistance, it may be more cost effective for companies to work with loyal customers. Loyal customers are understood as a niche set of an overall subscriber base which consists of loyal customers as well as non-loyal customers. Embodiments define loyalty and then loyal customers, providing a framework for telecommunications and banking domains.

Advertising campaigns may be targeted to customers who have both a high propensity to respond and who have earlier proven to be of high value. One such segment of customers that are often targeted is loyal customers. Loyalty modeling may be a key strategic differentiator for accepting or buying a product between customers who are going to promote the brand of the company to their acquaintances versus those who are going to act as detractors.

In embodiments, deep learning is used to minimize the cost function such that the model does not suffer from overfitting and at the same time a balance between the classes is maintained. Embodiments use an approach called "proportional hit rate" to recalibrate the overall accuracy of the model. By doing so, errors (false positives and false negatives) are penalized in a weighted manner.

In embodiments, out of time (OOT) validation datasets are devised such that one dataset represents each quarter of a year, i.e., each OOT dataset is separated by three months. Accordingly, embodiments reduce the chance of picking a model that is prone to overfitting. Embodiments also provide separate approaches for prediction based on less than 40 predictor variables and based on more than 40 predictor variables.

In embodiments, the number of events is reduced by a factor of up to 20, which leads to increased lift values. However, the number of non-events is not altered before using artificial neural networks (ANN).

In embodiments, integration of social media data with a columnar database may yield more accurate results. While a columnar database may only capture the last few months of subscriber activity, in embodiments, social media posts from up to two years ago are used to identify initial signs or reasons for churn.

In embodiments, Key Performing Indicators (KPIs) used for predictive modeling in telecommunications may include: Average Revenue Per User (ARPU) Segment from last 3, 6, 9 months; ARPU last 3 months; Total Voice Revenue last 12 months; Total Data Revenue last 12 months; Total Usage Amount last 12 months; Total Payable Amount last 12 months; Peak Duration since last 12 months; Incoming SMS Count; Incoming Minutes of Usage (same operator); Incoming Minutes of Usage (outside operator); and activity on social media using data from the last two years.

In embodiments, KPIs used for predictive modeling in banking may include: high margin product uptake (e.g., auto loan); semi-high margin product uptake (e.g., home loan, education loan); number of times the customer has breached a minimum allowable balance; frequency of transactions; number of cross-sell products purchased; and number of different types of products purchased.

Classical response modeling techniques such as logistic regression and decision trees are poorly suited for modeling for low event rates, such as in loyalty modeling and churn modeling. Embodiments address this problem by using machine learning including neural networks, deep learning, and transfer learning to model extremely rare events in high-dimensional space. Accordingly, embodiments improve the functioning of a computer by providing methods and systems that identify and track derived attributes, analyze the derived attributes on a neural network, use machine learning and statistical techniques to select, from the derived attributes, key performance indicators that are the most significant with respect to an extremely rare event, construct a linear model using the selected key performance indicators, and measure the performance of the constructed linear model on different datasets. Additionally, embodiments address the problem of bias in predictive models by reducing the number of events and address the problem of overfitting by using OOT validation datasets (e.g., separated by three months). Additionally, implementations of the invention use techniques that are, by definition, rooted in computer technology (e.g., machine learning, neural networks, deep learning, and transfer learning).

In an example, assume that a user is using company A for all of his or her telecommunications needs, including domestic calling, international calling, messaging, and data. Now, company B offers messaging and international calling services. On one hand, there is collaboration between company A and company B as the messaging and international calling services of company B are used in conjunction with the data service of company A. On the other hand, there is direct competition among company A and company B with respect to the messaging and international calling services.

As described herein, aspects of the invention predict subscriber churn (e.g., switching from company A to company B in the above example) and propensity to use services such as international calling using neural networks and provide for improved automated email marketing (e.g., targeting customers predicted to switch companies). In embodiments, behaviors may be identified that lead to a higher probability of retention and decrease churn. In embodiments, marketing and product initiatives may be improved through identification of factors that lead to churn and by streamlining the new user experience towards realizing key early behaviors that improve retention.

In embodiments, churn prediction models use customers' historical data to identify patterns in user behavior that are indicative of churn before it happens. This enables marketers to target campaigns specifically to customers who are predicted to be at-risk of terminating their relationship with businesses, and intervene in some way, for example, by offering a discount or promoting something of interest to the customers. As described herein, aspects of the invention use neural networks, deep learning, and transfer learning to predict churn when the churn rate is below 1%.

In an example, campaigns may be targeted to users who have both a high propensity to respond and users who have previously proven to be of high value. One such segment of customers that are targeted is loyal customers. Loyalty modeling may be a key strategic differentiator for accepting or buying a product between customers who are going to promote the brand of the company to their acquaintances versus those who are going to act as detractors. This type of modeling falls under classification modeling. The event rates for such classification model is quite rare (typically 1% to 2% and sometimes much less than 1%) as they are campaign-related and the number of events may vary from as low as 100 to as high as 10,000 across three to six months of data.

In embodiments, several models may be generated and then the model having the highest lift may be selected (e.g., the greatest number of loyal responders captured in the first decile, then lesser number of such responders captured in the second decile, and so on, such that the top few deciles capture ~80% or more responders). In embodiments, the Area Under the Curve (AUC) is maximized (e.g., higher than 0.7), as is the Kolmogorov Smirnov (K-S) statistic.

Techniques such as logistic regression and decision trees may have limitations when modeling for low event rates. Methods such as decision trees, logistic regression, and C5.0 (a system that extracts informative patterns from data) may not be able to meet the above criteria even after several combinations, such as C5.0 Expert Options Winnow Attributes top ten predictors and Chi-square Automatic Interaction Detector (CHAID) (a tool used to discover relationships between variables) top five predictors based on their predictor importance followed by C5.0 Simple Options on the top ten predictors.

Embodiments use machine learning and neural networks to generate models that meet the above criteria. In embodiments, the number of events is reduced (i.e., using balance) by a factor of up to 20. For some classification models, neural networks bagging using multilayer perceptron (MLP) is performed after dropping the highly collinear derived attributes. While this formula performs well for models which have a very low number of events, it does not perform well on OOT validation data for models that have a slightly high number of events, such as 500 to 1,000 events. Accordingly, in embodiments, balance is first performed to reduce the number of events. In other words, even though the event rate may be very low, in an example having 500 to 1,000 events, it is still possible to reduce the number of events by a factor of up to 20. This is not the same as underfitting because the "Hit and Trial" method is used, which may provide better results while using neural networks. In embodiments, C5.0 Winnow Attributes is applied for derived attribute selection and reduced overfitting (to provide robustness) followed by neural networks bagging (i.e., bootstrap aggregation) using multilayer perceptron. Derived attributes causing high multi collinearity are dropped.

In embodiments, neural networks are configured with one hidden layer with one hidden neuron. The default combining rule for categorical targets is voting, and the default combining rule for continuous targets is mean. The number of components for boosting and/or bagging is 10, and the bagging option is enabled.

In embodiments, to further increase the accuracy of the model, deep learning is used to integrate the model with the customer comments posted on social media sites from up to two years ago, where he or she may have made posts indicating reasons for churn or for wanting a new relevant tailored offer (e.g., posts indicating dissatisfaction with a service provider).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
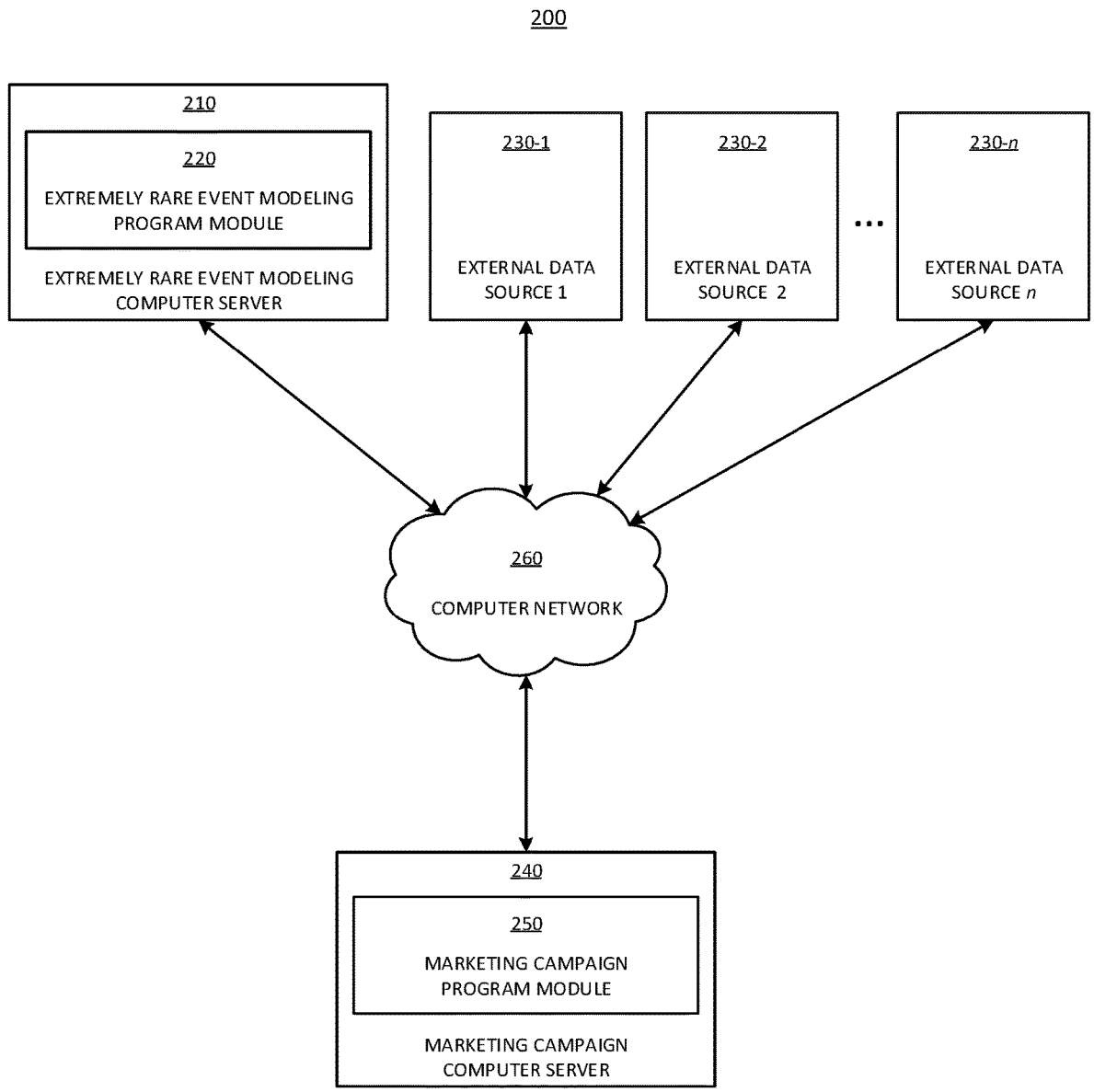
FIG. 2 depicts an illustrative environment in accordance with aspects of the invention.

FIG. 2 depicts an illustrative environment 200 in accordance with aspects of the invention. As shown, the environment 200 comprises an extremely rare event modeling computer server 210, a plurality of external data sources 230-1, 230-2, . . . , 230-n, and a marketing campaign computer server 240 which are in communication via a computer network 260. In embodiments, the computer network 260 is any suitable network including any combination of a LAN, WAN, or the Internet. In embodiments, the extremely rare event modeling computer server 210, the plurality of external data sources 230-1, 230-2, . . . , 230-n, and the marketing campaign computer server 240 are physically collocated, or, more typically, are situated in separate physical locations.

The quantity of devices and/or networks in the environment 200 is not limited to what is shown in FIG. 2. In practice, the environment 200 may include additional devices and/or networks; fewer devices and/or networks; different devices and/or networks; or differently arranged devices and/or networks than illustrated in FIG. 2. Also, in some implementations, one or more of the devices of the environment 200 may perform one or more functions described as being performed by another one or more of the devices of the environment 200.

In embodiments, the extremely rare event modeling computer server 210 is a computer device comprising one or more elements of the computer system/server 12 (as shown in FIG. 1). In particular, the extremely rare event modeling computer server 210 is implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, the extremely rare event modeling computer server 210 includes an extremely rare event modeling program module 220, which includes hardware and/or software and is one or more of the program modules 42 shown in FIG. 1. According to an embodiment, the extremely rare event modeling program module 220 includes program instructions for modeling extremely rare events. In embodiments, the program instructions included in the extremely rare event modeling program module 220 of the extremely rare event modeling computer server 210 are executed by one or more hardware processors.

Still referring to FIG. 2, in embodiments, each of the plurality of external data sources 230-1, 230-2, . . . , 230-n is a computer device comprising one or more elements of the computer system/server 12 (as shown in FIG. 1). In particular, each of the plurality of external data sources 230-1, 230-2, . . . , 230-n is implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, each of plurality of external data sources 230-1, 230-2, . . . , 230-n stores or provides access to data including a plurality of derived attributes/metrics (and/or data from which the derived attributes/metrics are derived) used by the extremely rare event modeling program module 220 to model extremely rare events. Each of the plurality of external data sources 230-1, 230-2, . . . , 230-n may be associated with and/or include data from one or more service providers or other companies.

For example, external data source 230-1 may be associated with a telecommunications operator and may include data for a plurality of customers including Average Revenue Per User (ARPU) Segment from last 3, 6, 9 months; ARPU last 3 months; Total Voice Revenue last 12 months; Total Data Revenue last 12 months; Total Usage Amount last 12 months; Total Payable Amount last 12 months; Peak Duration since last 12 months; Incoming SMS Count; Incoming Minutes of Usage (same operator); Incoming Minutes of Usage (outside operator); and activity on social media using data from the last two years.

Continuing with the example above, external data source 230-2 may be associated with a financial institution and may include data for a plurality of customers including high margin product uptake (e.g., auto loan); semi-high margin product uptake (e.g., home loan, education loan); number of times the customer has breached a minimum allowable balance; frequency of transactions; number of cross-sell products purchased; and number of different types of products purchased.

Still referring to FIG. 2, in embodiments, the marketing campaign computer server 240 is a computer device comprising one or more elements of the computer system/server 12 (as shown in FIG. 1). In particular, the marketing campaign computer server 240 is implemented as hardware and/or software using components such as mainframes; RISC (Reduced Instruction Set Computer) architecture based servers; servers; blade servers; storage devices; networks and networking components; virtual servers; virtual storage; virtual networks, including virtual private networks; virtual applications and operating systems; and virtual clients.

In embodiments, the marketing campaign computer server 240 includes a marketing campaign program module 250, which includes hardware and/or software and is one or more of the program modules 42 shown in FIG. 1. According to an embodiment, the marketing campaign program module 250 includes program instructions for implementing a marketing campaign. In embodiments, the program instructions included in the marketing campaign program module 250 of the marketing campaign computer server 240 are executed by one or more hardware processors.

Figure 3:
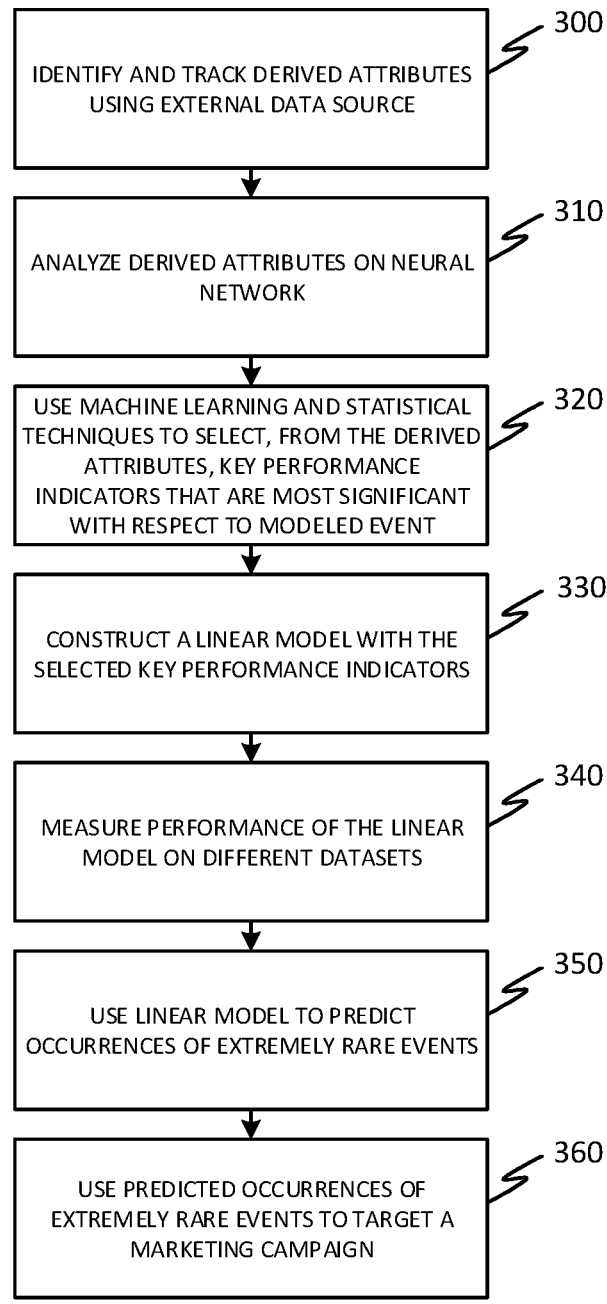
FIG. 3 depicts a flowchart of an exemplary method performed in accordance with aspects of the invention.

FIG. 3 depicts a flowchart of an exemplary method performed by the extremely rare event modeling program module 220 of the extremely rare event modeling computer server 210 in accordance with aspects of the invention. The steps of the method are performed in the environment of FIG. 2 and are described with reference to the elements shown in FIG. 2.

At step 300, the extremely rare event modeling computer server 210 identifies and tracks derived attributes using an external data source. In embodiments, the extremely rare event modeling program module 220 accesses the plurality of external data sources 230-1, 230-2, . . . , 230-n to determine derived attributes (metrics) using the external data sources 230-1, 230-2, . . . , 230-n that are potentially usable as key performance indicators. The derived attributes include any metrics that are stored in the plurality of external data sources 230-1, 230-2, . . . , 230-n or that may be derived from data (e.g., customer data, demographics, usage, location, behavior, etc.) stored in the plurality of external data sources 230-1, 230-2, . . . , 230-n and that are potentially useful as predictors in the model.

In an example, in a model generated for email marketing, derived attributes identified by the extremely rare event modeling program module 220 at step 300 may include one or more of email stickiness (i.e., how well an email resonates with a recipient), viewing duration, page category, email category, user-initiated search sessions, user search depths (level of detail that a user goes through), recency of purchase, repeat purchase behavior, transaction value, past experience, and/or discounts, etc.

Still referring to FIG. 3, at step 310, the extremely rare event modeling computer server 210 analyzes the derived attributes on a neural network. In embodiments, the extremely rare event modeling program module 220 analyzes the derived on a neural network that is suited for node level analysis using machine learning techniques including deep learning and transfer learning.

In particular, in embodiments, the extremely rare event modeling program module 220 configures the neural network with one hidden layer with one hidden neuron. The default combining rule for categorical targets is voting, and the default combining rule for continuous targets is mean. The number of components for boosting and/or bagging is 10, and the bagging option is enabled.

Still referring to FIG. 3, at step 320, the extremely rare event modeling computer server 210 uses machine learning and statistical techniques to select, from the derived attributes, key performance indicators that are the most significant with respect to the modeled event from the derived attributes. In embodiments, the extremely rare event modeling program module 220 uses machine learning techniques including neural networks, deep learning, and transfer learning to select, from the derived attributes, key performance indicators that are the most significant with respect to the extremely rare event (e.g., churn, international dialing, etc.) being modeled.

In particular, in embodiments, for the key performance indicator selection at step 320, the extremely rare event modeling program module 220 uses C5.0 Winnow Attributes and/or CHAID to identify relationships between derived attributes and automatically select derived attributes for use as the key performance indicators while reducing overfitting. In an example, the extremely rare event modeling program module 220 determines a list of 15 predictors to use as the key performance indicators. For prediction, the extremely rare event modeling program module 220 uses a neural network, support vector machines, and/or C5.0.

Still referring to step 320, in embodiments, for key performance indicator selection in cases where the event rate is under 1%, the extremely rare event modeling program module 220 uses a neural network MLP bagging method. The extremely rare event modeling program module 220 uses a balance factor <<1 and assumes at least 10 events in the input data and at least 10-20 events in each of training (development), testing (validation), and OOT.

In embodiments, the extremely rare event modeling program module 220 does not perform sampling or reduce the number of non-events at step 320. However, at step 320, the extremely rare event modeling program module 220 drops derived attributes that show high multi-collinearity. In embodiments, the threshold for collinearity is 0.3, i.e., the Variance Inflation Factor (VIF) is (1/(0.3*0.3))=1.1.

Still referring to step 320, in embodiments, the extremely rare event modeling program module 220 uses neural nets configured to delete listwise. The extremely rare event modeling program module 220 uses the C5.0 option to favor generality instead of accuracy, removes undersampling/oversampling/balancing, and applies bagging for all of the neural network models. The extremely rare event modeling program module 220 uses Receiver Operating Characteristic (ROC) instead of lift as a metric as ROC is less influenced by response rate compared to lift since both the x axis and the y axis change. In embodiments, the extremely rare event modeling program module 220 identifies anomalies using the lift curve, gains curve, etc.

Still referring to step 320, in embodiments, the extremely rare event modeling program module 220 reduces the number of events before applying predictions for models that are not showing acceptable results using neural network bagging techniques with the bootstrap aggregation option. In particular, in embodiments, reducing the number of events reduces model bias when using neural networks and increases the lift value.

Still referring to step 320, in embodiments, the extremely rare event modeling program module 220 transforms numerical input attributes into feature vectors such as slope and ratio related variables to yield a smaller number of numeric predictors. In embodiments, the extremely rare event modeling program module 220 does not perform feature selection or variable selection if the total number of predictors in a neural networks model is less than 40 but instead selects key predictors that are used as the top predictors.

Still referring to step 320, in embodiments, the extremely rare event modeling program module 220 minimizes the number of key performance indicators in the model unless there are more than 100 events in the original data. Additionally, the extremely rare event modeling program module 220 ensures that there are at least 10 events for each key performance indicator. The extremely rare event modeling program module 220, for all derived attributes, checks the number of events in each category of a derived attribute.

Still referring to step 320, in embodiments, the extremely rare event modeling program module 220 does not perform feature scaling, as this function is performed internally by the neural network. The extremely rare event modeling program module 220 may normalize data, however, normalizing data degrades the interpretability, so this step is optional.

In an example, "product features," "quality," "cost," "customer service," "availability/delivery," and "technical support" are nodes in the first hidden layer in the neural network, which are inputs for "perceived value" in the second hidden layer in the neural network. Additionally, "number of emails opened," "pages visited," "Twitter posts," "time since last visit," "articles clicked to visit," "videos watched," and "reviews written" are also nodes in the first hidden layer in the neural network, which are inputs for "business/commercial relationship" in the second hidden layer in the neural network. "Perceived value" and "business/commercial relationship" are inputs in the third hidden layer in the neural network, "satisfaction." In the third hidden layer in the neural network, latent variables include "customer characteristics," "satisfaction," "brand image," "percent users renewed," "percent trial users converted to paid," "email distribution count," "number of customers in database," and "lifetime value:customer acquisition cost." These are direct inputs to target "loyalty intent."

Still referring to FIG. 3, at step 330, the extremely rare event modeling computer server 210 constructs a linear model with the selected key performance indicators. In embodiments, the extremely rare event modeling program module 220 uses machine learning techniques including neural networks, deep learning, and transfer learning to construct the linear model for a dynamic and scalable environment.

At step 340, the extremely rare event modeling computer server 210 measures the performance of the linear model on different datasets. In embodiments, the extremely rare event modeling program module 220 uses machine learning techniques including neural networks, deep learning, and transfer learning to measure the performance of the linear model on different datasets. In particular, in embodiments, OOT validation datasets are devised such that one dataset represents each quarter, i.e., each OOT dataset is separated by three months. Accordingly, embodiments reduce the chance of picking a model that is prone to overfitting.

In embodiments, the extremely rare event modeling program module 220 computes a proportional hit rate as a measure of accuracy. In particular, the proportional hit rate is calculated using Formula 1, below:

> Proportional Hit Rate=(square of true positives+ square of true negatives)/(true positives+true negatives+false positives+false negatives)     Formula 1

In other embodiments, a cube of the true positives and a cube of the true negatives may be substituted for the square of the true positives and the square of the true negatives in Formula 1. In yet other embodiments, an nth power of the true positives and an nth power of the true negatives may be substituted for the square of the true positives and the square of the true negatives in Formula 1.

Still referring to FIG. 3, at step 350, the extremely rare event modeling computer server 210 uses the linear model to predict occurrences of extremely rare events. In embodiments, the extremely rare event modeling program module 220 uses the linear model constructed at step 330 to predict occurrences of extremely rare events. For example, the linear model may be used to predict churn events.

At step 360, the extremely rare event modeling computer server 210 and the marketing campaign computer server 240 use the predicted occurrences of extremely rare events to target a marketing campaign. In embodiments, the extremely rare event modeling program module 220 sends information about the predicted occurrences of extremely rare events from step 350 to the marketing campaign program module 250 running on the marketing campaign computer server 240. The marketing campaign program module 250 then uses the received information to target the marketing campaign. In an example, the marketing campaign program module 250 causes emails to be sent with a targeted offer to customers selected using the predicted occurrences of extremely rare events (e.g., churn).

In an example, voluntary and involuntary churn are defined, and then a model is constructed that focuses on voluntary (i.e., "soft") churn. Churn is classified as operational churn or monetary churn, churn rate is defined, and a proportion of events that are churn vs. non-churn is determined. Filters are applied to the overall population, which results in a modeling base. The filters may be used to ignore particular subscribers (e.g., those who do not have a smartphone). Next, a 12.5% random sample is selected from the modeling base. A training and validation dataset is prepared (with the validation data being created using in-sample data), as well as the observation and prediction windows. Next, model stability is checked by picking data from one month during each of the last three quarters (out of the sample data). The events are reduced from 0.02% to a smaller percentage such as 0.002%, while not reducing the number of non-events. With the number of predictors less than or equal to 40, it is not necessary to select a subset of predictors, as this is performed automatically using neural networks. Finally, neural networks are selected to perform the prediction, while collinearity is removed among predictors.

In embodiments, a service provider could offer to perform the processes described herein. In this case, the service provider can create, maintain, deploy, support, etc., the computer infrastructure that performs the process steps of the invention for one or more customers. These customers may be, for example, any business that uses cloud computing technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   identifying, by a computing device, a plurality of derived attributes using an external data source;
   selecting, by the computing device, a plurality of key performance indicators from the plurality of derived attributes using a neural network and based on an extremely rare event being modeled, each of the plurality of key performance indicators being selected assuming a predetermined minimum number of at least ten events in training data of the neural network for each of the key performance indicators;
   constructing, by the computing device, a linear model using the plurality of key performance indicators including social media data;
   predicting, by the computing device, occurrences of the extremely rare event using the linear model; and
   measuring, by the computing device, performance of the linear model on different datasets including out of time (OOT) validation datasets,
   wherein the performance of the linear model is measured by computing accuracy as a measure of a proportional hit rate.

2. The method according to claim 1, further comprising analyzing, by the computing device, the plurality of derived attributes on the neural network.

3. The method according to claim 1, wherein the selecting the plurality of key performance indicators comprises using C5.0 Winnow Attributes to automatically select the plurality of key performance indicators while reducing overfitting.

4. The method according to claim 3, wherein the selecting the plurality of key performance indicators further comprises performing neural network bagging using multilayer perceptron.

5. The method according to claim 1, wherein the selecting the plurality of key performance indicators comprises using Chi-square Automatic Interaction Detector (CHAID) to automatically select the plurality of key performance indicators while reducing overfitting.

6. A computer program product comprising a computer readable storage medium having program instructions embodied therewith, the program instructions executable by a computing device to cause the computing device to:
   identify a plurality of derived attributes;
   select a plurality of key performance indicators from the plurality of derived attributes using a neural network and based on an extremely rare event being modeled;
   construct a linear model using the plurality of key performance indicators;
   predict occurrences of the extremely rare event using the linear model;
   measure performance of the linear model on different datasets, wherein the performance of the linear model is measured by computing accuracy as a measure of a proportional hit rate; and
   target a marketing campaign using the predicted occurrences of the extremely rare event.

7. The computer program product according to claim 6, the program instructions further being executable by the computing device to cause the computing device to analyze the plurality of derived attributes on the neural network, wherein the selecting comprises minimizing a number of the key performance indicators unless a number of events exceeds a predefined number.

8. The computer program product according to claim 6, the program instructions further being executable by the computing device to cause the computing device to measure performance of the linear model on different datasets including out of time (OOT) validation datasets.

9. The computer program product according to claim 8, wherein the proportional hit rate is used to recalibrate an overall accuracy of the linear model and penalizing errors with a weighting.

10. The computer program product according to claim 6, wherein the selecting the plurality of key performance indicators comprises using C5.0 Winnow Attributes to automatically select the plurality of key performance indicators while reducing overfitting.

11. The computer program product according to claim 10, wherein the selecting the plurality of key performance indicators further comprises performing neural network bagging using multilayer perceptron.

12. The computer program product according to claim 6, wherein the selecting the plurality of key performance indicators comprises using Chi-square Automatic Interaction Detector (CHAID) to automatically select the plurality of key performance indicators while reducing overfitting.

13. A system comprising:
   a hardware processor, a computer readable memory, and a computer readable storage medium associated with a computing device;
   program instructions to identify a plurality of derived attributes;
   program instructions to select a plurality of key performance indicators from the plurality of derived attributes using a neural network and based on an extremely rare event being modeled, wherein the extremely rare event includes a less than one percent occurrence rate over a predetermined period of time;
   program instructions to integrate social media data indicating reasons for the extremely rare event with the key performance indicators;
   program instructions to construct a linear model using the plurality of key performance indicators;
   program instructions to predict occurrences of the extremely rare event using the linear model; and
   program instructions to measure performance of the linear model on different datasets including out of time (OOT) validation datasets,
   wherein the performance of the linear model is measured by computing accuracy as a measure of a proportional hit rate, and
   the program instructions are stored on the computer readable storage medium for execution by the hardware processor via the computer readable memory.

14. The system according to claim 13, further comprising program instructions to analyze the plurality of derived attributes on the neural network wherein the selecting comprises ensuring there are at least a predefined number of events for each of the key performance indicators.

15. The system according to claim 13, wherein the selecting the plurality of key performance indicators comprises using C5.0 Winnow Attributes to automatically select the plurality of key performance indicators while reducing overfitting.

16. The system according to claim 13, wherein the selecting the plurality of key performance indicators comprises using Chi-square Automatic Interaction Detector (CHAID) to automatically select the plurality of key performance indicators while reducing overfitting.

* * * * *